United States Patent [19]
Machiya et al.

[11] Patent Number: 5,514,267
[45] Date of Patent: May 7, 1996

[54] APPARATUS FOR DISSOLVING A GAS INTO AND MIXING THE SAME WITH A LIQUID

[75] Inventors: Katsuyuki Machiya, Toyama; Kimio Hirasawa, Yatsuo; Tokio Hori; Masakazu Kashiwa, both of Toyama; Takayuki Kinoshita, Matsumoto, all of Japan

[73] Assignee: Idec Izumi Corporation, Osaka, Japan

[21] Appl. No.: 90,108

[22] PCT Filed: May 12, 1993

[86] PCT No.: PCT/JP93/00629

§ 371 Date: Jul. 12, 1993

§ 102(e) Date: Jul. 12, 1993

[87] PCT Pub. No.: WO93/23340

PCT Pub. Date: Nov. 25, 1993

[30] Foreign Application Priority Data

| | | | |
|---|---|---|---|
| May 14, 1992 | [JP] | Japan | 4-148769 |
| May 18, 1992 | [JP] | Japan | 4-149880 |
| Aug. 17, 1992 | [JP] | Japan | 4-239967 |
| Sep. 17, 1992 | [JP] | Japan | 4-275159 |
| Jan. 22, 1993 | [JP] | Japan | 5-27306 |

[51] Int. Cl.⁶ ............................ B01F 3/04; C02F 1/24
[52] U.S. Cl. ..................... 210/170; 210/242.2; 210/221.2; 210/220; 210/703; 261/36.1; 261/120; 261/DIG. 42; 261/DIG. 75
[58] Field of Search ............................ 210/703, 707, 210/242.2, 747, 170, 220, 221.1, 221.2, 748; 261/120, DIG. 42, DIG. 75, 36.1

[56] References Cited

U.S. PATENT DOCUMENTS

| | | |
|---|---|---|
| 3,271,304 | 9/1966 | Valdespino . |
| 3,479,281 | 11/1969 | Kikindai . |
| 3,587,976 | 6/1971 | Jacuzzi . |
| 3,904,393 | 9/1975 | Morse . |
| 4,221,336 | 9/1980 | Diamond . |
| 4,659,463 | 4/1987 | Chandler et al. . |
| 4,911,836 | 3/1990 | Haggerty . |
| 5,080,802 | 1/1992 | Cairo . |
| 5,087,377 | 2/1992 | Josefik . |
| 5,232,582 | 8/1993 | Takahashi . |

FOREIGN PATENT DOCUMENTS

| | | |
|---|---|---|
| 2315983 | 1/1977 | France . |
| 0209095 | 1/1987 | Germany . |
| 3733583 | 3/1987 | Germany . |
| 3724692A1 | 2/1989 | Germany . |
| 49-34159 | 3/1974 | Japan . |
| 662117 | 5/1979 | U.S.S.R. . |

*Primary Examiner*—Thomas M. Lithgow
*Attorney, Agent, or Firm*—Frishauf, Holtz, Goodman, Langer & Chick

[57] ABSTRACT

An apparatus for mixing a gas with a liquid and for dissolving the gas in the liquid comprises a throttled section (12) formed in a fluid flow passage, a gas inlet (18) provided slightly downstream of the throttled section (12), a widened section (16) which is continuous with the throttled section (12), a mixing section (20) provided downstream of the widened section (16), for mixing the gas introduced from the gas inlet (18) with the liquid in the fluid flow passage, and a nozzle section (24) provided on the outlet of the mixing section (20) for outputting the liquid with the gas dissolved therein. The gas is dissolved in the liquid in the mixing section by pressurizing the liquid in the mixing section. The apparatus is useful for dissolving ozone into a liquid, for dispersing bubbles in a liquid and for floating small particles in a liquid.

22 Claims, 10 Drawing Sheets

APPARATUS FOR DISSOLVING A GAS INTO AND MIXING THE SAME WITH A LIQUID

TECHNICAL FIELD

This invention relates to an apparatus for disperse-mixing gas bubbles with a liquid and dissolving a gas into a liquid efficiently.

BACKGROUND ART

Conventionally, a so-called ejector type bubble generator has been used as an apparatus for disperse-mixing a great amount of a gas with a liquid. With this bubble generator, a liquid jet sprayed out from a nozzle hole or nozzle holes is made to pass through a gas to be mixed with the liquid, and the gas around the liquid jet is drawn in it. Then, the gas mixture is jetted out into tile liquid From a throttle or throttles having substantially the same diameter as that of the nozzle hole or tile nozzle holes and provided coaxially therewith. In this way, a liquid is mixed with fine bubbles.

In some apparatuses, the fine bubble-dispersed jet produced by the above-mentioned processes is supplied to the lower portion of a tank in which the bubbles are dispersed as they are rising. A great amount of gas is dissolved in the liquid while the fine bubbles are rising in the liquid in the tank, thereby producing a Liquid into which a required gas is dissolved.

In some other apparatuses, a liquid and a gas are supplied to a pressure pump and are pressurized to dissolve the gas into the liquid. Thereafter, the pressure on tile gas-dissolved liquid is reduced so as to precipitate the gas dissolved in the liquid, thereby forming bubbles in the liquid.

When the conventional ejector type bubble generator is used, the liquid jet nozzle holes and throttles must be aligned with each other, leading to a complicated structure of the apparatus and requiring difficult assembling processes. The liquid-dissolving apparatus using a bubble tank requires a long starting time for obtaining a liquid into which a gas begins to be fully dissolved and provides poor manufacturing efficiency.

In the conventional apparatus using a pressure pump, a gas and a liquid are supplied together to the pressure pump. This is likely to produce cavitation in tile pressure pump. In order to prevent the cavitation, the material and the structure of the pressure pump are limited. Upon producing bubbles under the pressure dissolving process, only a gas dissolved in the liquid under pressure is precipitated, and thus it is impossible with the pressure reducing process to precipitate a larger amount of gas than that dissolved in the liquid. Accordingly, a very high pressure is required in order to produce a great amount of bubbles. This makes the apparatus bulky and cavitation is general very easily.

This invention has been made in order to overcome the problems which the prier art encounters and is intended to provide a method and an apparatus for dissolving a gas into and mixing the same with a liquid, which has a simple structure, forms fine bubbles in the liquid continuously and efficiently and mixes a great amount of gas with a liquid and dissolves the gas into the liquid efficiently.

SUMMARY OF THE INVENTION

The first aspect of this invention is to provide an apparatus For dissolving a gas into and mixing the same with a liquid, comprising a throttled section such as a Venturi tube, an orifice or the like provided in a fluid flow passage, a gradually widened section continuous with the throttled section, a gas inlet provided in the widened section slightly downstream of the throttled section, a mixing section provided downstream of the widened section, for mixing a liquid in a fluid flow passage with the gas flowing from the gas inlet into the mixing section, and a nozzle section provided on the outlet of the mixing section.

In the apparatus according to the first aspect of this invention, the gas is caused to flow into the liquid flow from a negative pressure section slightly downstream of the throttled section such as the throat section of the Venturi tube or the like. When gas flows in the mixing section, its flow speed is reduced and its static pressure increases. The gas is pressurized and dissolved in the liquid in the mixing section. The gas-liquid mixture is accelerated at the nozzle section on the outlet of the fluid flow passage. A turbulence occurs in the gas-liquid mixture flow such that mixed bubbles are sheared and divided and the gas dissolved in the liquid is precipitated as bubbles from the liquid. In this way the bubbles are produced.

The second aspect of this invention is to provide an apparatus for dissolving a gas into and mixing the same with a liquid, comprising a liquid supplying section for delivering, under a predetermined pressure, a liquid into which a predetermined gas is to be dissolved; a mixing unit for mixing the gas with the liquid under pressure delivered from the liquid supplying section, the mixing unit comprising a throttled section forming a Venturi tube, an orifice or the like provided in a fluid flow passage, a gas inlet provided slightly downstream of the throttled section, a widened section continuous with the throttled section and formed by gradually widening a portion of the fluid flow passage, a mixing section provided downstream of the widened section for mixing the gas introduced from the gas inlet with the liquid in the fluid flow passage and a nozzle section provided on the outlet of the mixing section, a gas supplying section connected to the gas inlet and a liquid storing section which is connected to the nozzle section of the mixing unit and into which flows the liquid with the gas dissolved thereinto at the mixing section.

The third aspect of this invention is to provide an apparatus for dissolving a gas into and mixing the same with a liquid, comprising a first throttled section forming a Venturi tube, an orifice or the like provided in a portion off a fluid flow passage, a gradually widened section continuous with the first throttled section at a downstream side thereof, a gas inlet formed in a portion of the widened section slightly downstream off the first throttled section, a mixing section provided downstream of the widened section for mixing a gas introduced from the gas inlet with a liquid in the fluid flow passage, a nozzle section having a plurality of nozzle holes and provided on a downstream portion of the mixing section through a liquid flow pipe, and a second throttled section provided just in front of the nozzle section.

Further, the third aspect of this invention is to provide an apparatus for dissolving a gas into and mixing the same with a liquid, comprising a first throttled section forming a Venturi tube, an orifice or the like provided in a portion of a fluid flow passage, a gradually widened section continuous with the first throttled section at a downstream side thereof, a gas inlet formed in a portion of the widened section slightly downstream off the first throttled section, a mixing section provided downstream of the widened section and connected to the fluid flow passage, for mixing a gas introduced from the gas inlet with a liquid in the fluid flow passage, branch portions connected to a downstream end of the mixing section, nozzle holes provided downstream of the respective branch portions, and a second throttled section provided just in front of the branch portions.

Such a gas-liquid dissolving and mixing apparatus enables a gas to flow from the negative pressure section of the gas inlet into the fluid flow passage and allows the gas to be mixed with the liquid and to be dissolved thereinto in the mixing section in which the static pressure is high. Even when the bubbles are distributed unevenly in the fluid flow passage, the gas is mixed with tile liquid again in the second throttled section so as to make the bubble distribution even, thereby jetting out evenly distributed bubbles from each of the nozzle holes. When the liquid with which bubbles are mixed is jetted out from the nozzle holes, the bubbles in the liquid are sheared and divided and the dissolved gas is precipitated from the liquid to form fine bubbles. The provision of the second mixing section Just in front of the branch portions of the fluid flow passage allows the bubbles to be evenly dispersed in the liquid to be branched. Thus, the liquid evenly mixed with the gas is jetted from the nozzle section.

The fourth aspect of this invention is to provide an apparatus for dissolving a gas into and mixing the same with a liquid, comprising a throttled section such as a Venturi tube, an orifice or the like formed by throttling a portion of a fluid flow passage, a gradually widened section formed on a portion of the fluid flow passage downstream of the throttled section, a gas inlet provided slightly downstream of the throttled section, a pressure-mixing flow passage having repeated steep and gentle slopes for flowing fluids downward, a nozzle hole provided on the outlet or a downstream end of the pressure-mixing flow passage, an intermediate throttle having a larger diameter than that of the nozzle hole and provided in an intermediate portion of the pressure-mixing flow passage, and pressure measuring means for measuring the pressure of the fluid flow passage at least at the outlet side of the intermediate throttle in the pressure-mixing flow passage.

In such a gas-liquid dissolving and mixing apparatus, a gas is caused to flow from the gas inlet slightly downstream of the throttled section into the liquid flow. The gas and the liquid are mixed together and the gas flowing into the throttled section is caused to dissolve under pressure into the liquid in the widened section in which the flow speed becomes slow. Since tile gas flows in both tile upper and lower portions of the pressure-mixing flow passage, the contacting area of the gas and the liquid increases. The provision of the nozzle hole on the outlet or a downstream end of tile pressure-mixing flow passage in which the gas-liquid mixture flows downward increases the static pressure in the pressure-mixing flow passage, thereby enhancing a chemical reaction rate and dissolving efficiency. Since the outlet is lower than the inlet, the gas-liquid mixture stays in the pressure-mixing flow passage so as to allow the denser liquid to flow more easily than the gas and more gas than the liquid stays in the pressure-mixing flow passage. Even if, therefore, the mixing rate of the gas in the liquid is small, it becomes larger in the pressure-mixing flow passage.

The fifth aspect of this invention is to provide an apparatus for dissolving a gas into and mixing the same with a liquid, comprising a gas-liquid mixing unit for mixing a gas with a liquid, a throttled section such as a Venturi tube, an orifice or the like provided in a liquid flow portion, a gas inlet formed slightly downstream of the throttled section, a gradually widened section of the liquid flow portion continuous with the throttled section, a mixing section provided downstream of the widened section for mixing the gas introduced from the gas inlet with the liquid in the fluid flow passage and a nozzle section provided on the outlet of the mixing section for jetting out bubbles having a size of several micrometers to several hundred micrometers into the liquid in which suspended particles exist.

In such an apparatus, the gas mixed in the liquid in the negative pressure section close to the throttled section is mixed again with the liquid and dissolved under pressure into the liquid in the mixing section and the liquid and the gas are jotted from the nozzle section. The gas is sheared and divided and then separated from the liquid such that bubbles having a size of several micrometers to several hundred micrometers are formed in the liquid. Relatively large bubbles catch the suspended particles in the liquid and float together with the particles. Larger bubbles which have floated together with the suspended particles are discharged from the suspended particles into the atmosphere. On the other hand, smaller bubbles which have floated together with the suspended particles are not separated therefrom and maintain the suspended particles at the floating position thereof.

DETAILED DESCRIPTION

Figure 1:
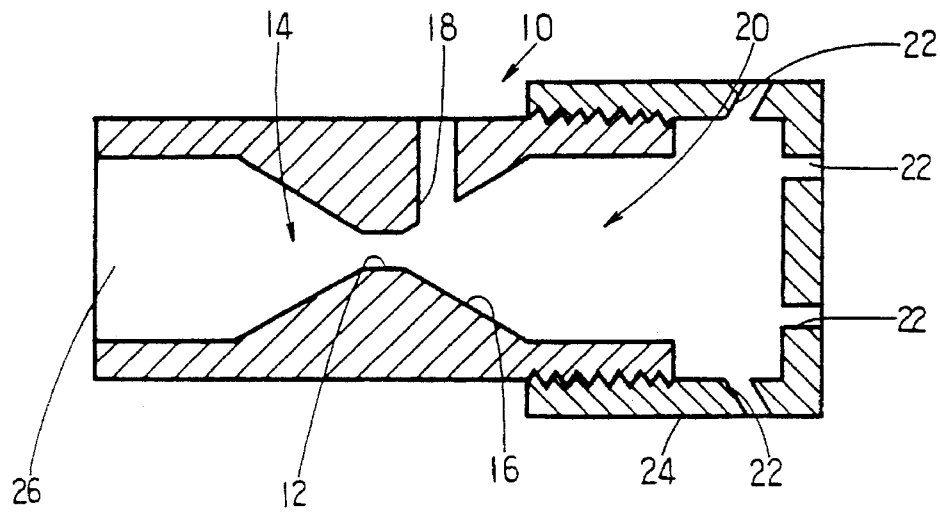
FIG. 1 is a longitudinal cross sectional view of the first embodiment of the gas-liquid dissolving and mixing apparatus according to this invention.
Figure 2:
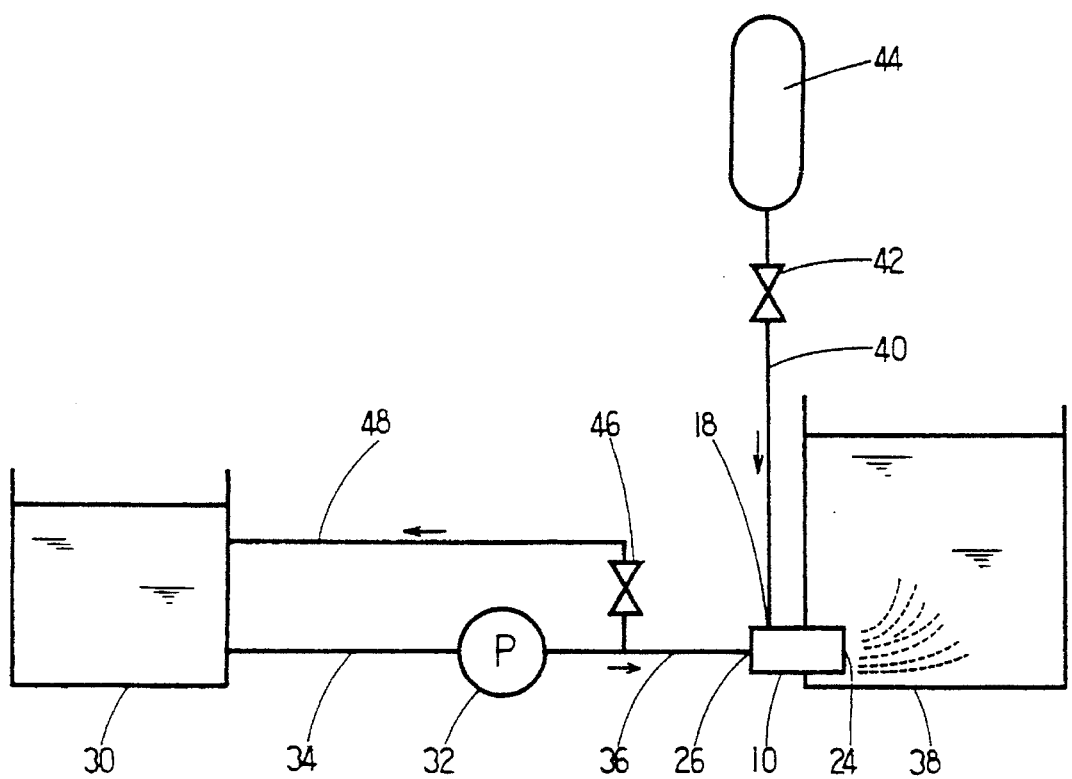
FIG. 2 is a pipe line diagram of a gas-dissolved water producing device using the first embodiment of the gas-liquid dissolving and mixing apparatus.

FIGS. 1 and 2 show the first embodiment of this invention.

As shown in FIG. 1, a mixing unit 10 for mixing a gas with a liquid has a Venturi tube 14 provided at a central portion thereof with a throat section 12 forming a throttled section. A widened section 16 provided downstream of the Venturi tube 14 is formed with a gas inlet 18 slightly downstream of the throat section 12, for introducing a gas into a fluid flow passage in the mixing unit 10.

At the downstream side of the widened section 16 is formed a mixing section 20 for mixing a gas introduced from the gas inlet 18 with a liquid in the fluid flow passage. The outer diameter of the mixing section 20 is arbitrarily selected according to the degree of pressure to be applied to the mixing section 20. In the first embodiment, the mixing section 20 extends toward the downstream side of the widened section 16 from the outer edge of its maximum diameter portion. A nozzle section 24 having a plurality of nozzle holes 22 is provided on the distal end of the mixing section 20.

The operation of the gas-liquid dissolving and mixing apparatus according to the first embodiment of this invention will now be described.

The liquid flowing into an inlet 26 of the mixing unit 10 is accelerated at the throat section 12 of the Venturi tube 14 and the static pressure of the liquid is lowered. As the liquid passes through the region of the widened section 16, the speed of the liquid decreases and the static pressure of the liquid increases again. Since the gas inlet 18 is disposed slightly downstream of the throat section 12 and the pressure there is relatively negative, the gas flows through the gas inlet 18 into the fluid flow passage. Although the static pressure is the minimum at the throat section 12, the gas inlet 18 is not provided there. This is because the gas is not well sucked in when the gas inlet 18 is provided at the throat section 12 but the gas is easily sucked in the fluid flow passage at the portion of the widened section 16 which starts to be broadened.

The gas flowing from the gas inlet 18 into the fluid flow passage is formed into bubbles and flows together with the liquid through the mixing section 20. Since the static pressure in the mixing section 20 is higher than that in the throat section 12, the bubbles are dissolved into the liquid. Then, the liquid together with the bubbles is jetted out from the nozzle holes 22. When the liquid passes through the nozzle holes 22, the liquid is accelerated again and its static pressure is lowered. Thus, the gas dissolved into the liquid is precipitated therefrom as fine bubbles. The bubbles which could not be dissolved into the liquid are divided into small-diameter bubbles by turbulence and the like when accelerated in the nozzle holes 22 and jetted out therefrom together with the liquid.

In the first embodiment, the relation between the cross sectional area of the widened section 16 at its connecting portion with the gas inlet 18 and the total cross sectional area of the nozzle holes 22 is defined by the following mathematical expressions:

$$P_A < P_G \tag{1}$$

where $P_G$ is the pressure of the gas flowing from the gas inlet 18 into the fluid flow passage; and $P_A$ is the static pressure in the widened section 16 at its connecting portion with the gas inlet 18, the static pressure being obtained from the equation of continuity and Bernoulli's Theorem in hydrodynamics.

$$P_A = (1 - S_B^2/S_A^2)P_1 + (\delta P + P_B)S_B^2/S_A^2 \tag{2}$$

where $S_A$ is the cross sectional area of the widened section 16 at its connecting portion to the gas inlet 18;

$S_B$ is the total cross sectional area of the nozzle holes 22;

$P_1$ is the total pressure in the widened section 16 at its connecting portion to the gas inlet 18;

$\delta P$ is the pressure loss between the widened section 16 at its connecting portion to the gas inlet 18 and the nozzle holes 22; and $P_B$ is the static pressure at the outlets of the nozzle holes 22.

By selecting the sizes of the widened section 16 at its connecting portion to the gas inlet 18 and the nozzle holes 22 so as to satisfy the expressions (1) and (2), the optimum conditions for mixing a gas with a liquid efficiently are obtained.

It is preferred that the mixing section 20 is designed such that the gas and the liquid stay in the mixing section 20 for enough contacting time to saturate the dissolution of the gas into the liquid. The contacting time depends on the volume of the mixing section 20 and thus the dissolution of the gas into the liquid is saturated well when the mixing section is made somewhat longer. When it is unnecessary for the gas to be dissolved into the liquid until the dissolution is saturated, the mixing section 20 may be made short.

The gas-liquid dissolving and mixing apparatus according to the first embodiment will now be described with reference to FIG. 2.

The apparatus has a water tank 30, a pump 32 connected to the water tank 30 via a pipe 34, for pumping out water under pressure, and the mixing unit 10 connected to the discharge port of the pump 32 via a pipe 36. The mixing unit 10 is fixed to the lower portion of a water tank or a liquid storing section 38 for storing a liquid into which a gas is dissolved such that the nozzle holes 24 are opened to the interior of the water tank 38. A gas tank 44 is connected to the gas inlet 18 of the mixing unit 10 via a pipe 40 and a flow control valve 42. A pipe 48 is connected at one end thereof to the pipe 36 via a relief valve 46 and at the other end to the water tank 30.

Water is supplied under pressure by the pump 32 from the water tank 30 to the mixing unit 10. As described above, a gas supplied from the gas tank 44 is mixed with the water in the mixing unit 10 and a great amount of the gas is dissolved into the water. Then, the gas-dissolved water is jetted together with bubbles from the nozzle holes 24 into a water tank 38. The relief valve 46 maintains constant the pressure of the water which is being supplied under pressure and the flow control valve 42 controls the flow rate of the gas such that fine gas bubbles are formed efficiently in the water. By experiments, a great amount of small bubbles were produced efficiently when the gas flow rate was 10 to 30% of the water flow rate. The bubbles jetted from the mixing unit 10 are dispersed in the water in the water tank 38. Since the bubbles are very small, they are suspended in the water for a long time. When it is required that bubbles be always dispersed in water, the pipes 34 and 36 and other elements may be arranged such that the water tanks 30 and 38 are commonly used.

TABLE 1

| AMOUNT OF ABSORBED GAS (liters per min) | OZONE WATER CONCEN- TRATION (ppm) | AMOUNT OF OZONE WATER PRODUCED (liters per min) | RISING TIME (sec) | TEM- PERA- TURE OF WATER (°C.) |
| --- | --- | --- | --- | --- |
| 250 | 2.0 | 1.54 | 30 | 14 |
| 500 | 4.5 | 1.50 | 30 | 16 |
| 750 | 5.5 | 1.50 | 30 | 16 |

Table 1 shows the experimental results of dissolution of gas into water. Here, the amount of ozone produced is 10000ppm, and the mixing unit 10 is made from a stainless steel pipe having a length of 0.7 meter.

The rising time in Table 1 means the time required for starting continuous production of ozone water having a required concentration after the apparatus has begun to operate. With the conventional bubble tank, the rising time is approximately 30 minutes. As compared therewith, the first embodiment of this invention requires a very short rising time of 30 seconds and thus produces gas dissolved water extremely efficiently in a short time.

Figure 3:
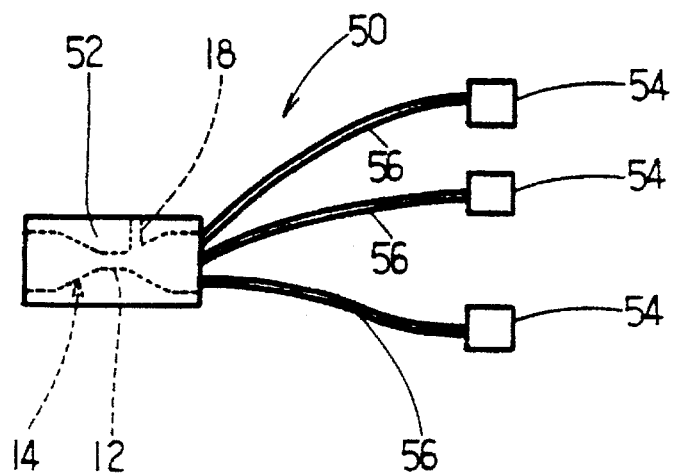
FIG. 3 is a general front view of the mixing unit of the second embodiment of the gas-liquid dissolving and mixing apparatus according to this invention.

The second embodiment of this invention will now be described with reference to FIG. 3. The same parts and elements of this embodiment as those of the first embodiment are shown by the same referential numerals and their explanation will be omitted.

The second embodiment has a mixing unit 50 comprising a main section 52 provided with a Venturi tube 14 forming a throttled section, nozzle sections 54 having nozzle holes and pipes 56 for connecting the nozzle sections 54 to the main section 52.

Each pipe 56 may be made from a steel pipe or a flexible pipe. Since a gas can be mixed well with a liquid in a turbulent flow, the pipe 56 may be made into a coil form or may be designed so as to provide more than the Reynolds number at which a turbulent begins to occur.

The nozzle sections 54 are placed at arbitrary positions and only the nozzle sections 54 can be made to move freely, providing wide versatility.

Figure 4:
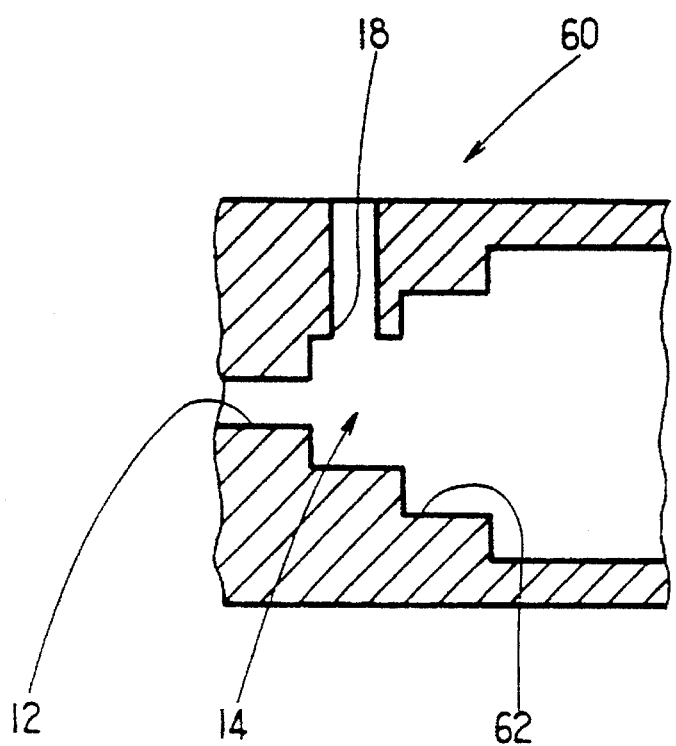
FIG. 4 is a partial cross sectional view of the mixing unit of the third embodiment of the gas-liquid dissolving and mixing apparatus according to this invention.

The third embodiment of this invention will now be described with reference to FIG. 4. The same parts and elements of this embodiment as those of the above embodiments are shown by the same referential numerals and their explanation will be omitted.

The third embodiment is provided with a mixing unit 60 having a Venturi tube 14 forming a throttled section. A widened section 62 which is continuous to a throat section 12 of the Venturi tube 14 comprises tandem, coaxially arranged, hollow cylindrical parts with the diameter of the cylindrical part at the downstream side of the mixing unit 60 made larger than the diameter of the cylindrical part at the downstream side of the mixing unit 60. This stepped structure of the widened section 62 facilitates the manufacture of the mixing unit 60.

Figure 5:
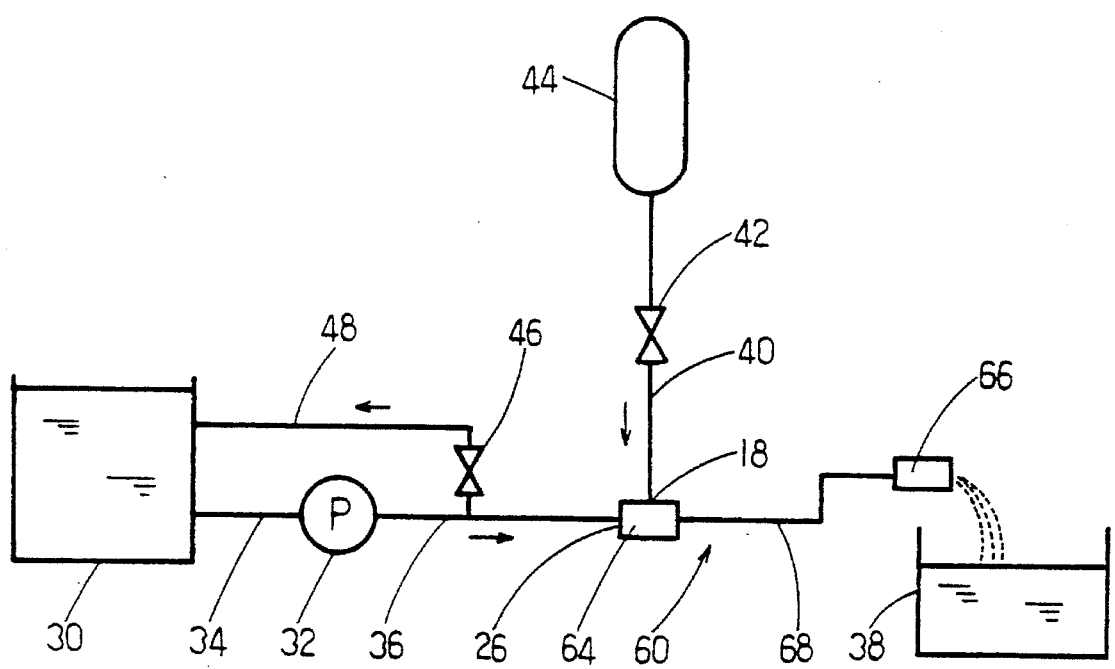
FIG. 5 is a pipe line diagram of a gas-dissolved water producing device using the fourth embodiment of the gas-liquid dissolving and mixing apparatus according to this invention.

The fourth embodiment of this invention will now be described with reference to FIG. 5. The same parts and elements of this embodiment as those of the above embodiments are shown by the same referential numerals and their explanation will be omitted. The gas-liquid dissolving and mixing apparatus of the fourth embodiment is intended to dissolve a gas into a liquid but does not disperse the bubbles in the liquid.

A mixing unit 60 comprises a main section 64 provided with a Venturi tube forming a throttled section, a nozzle section 66 having nozzle holes and disposed separately from the main section 64, and a pipe 68 also used as a mixing section and connecting the nozzle section 66 to the main section 64.

The pipe 68 may be made from a steel pipe or a flexible pipe. Since a gas can be mixed well with a liquid in a turbulent flow, the pipe 68 may be made into a coil form or may be designed to provide more than the Reynolds number at which a turbulent flow begins to occur. Further, a tube is connected to the distal end of the nozzle section 66 so as to reduce the speed of a liquid jetted from the nozzle section 66.

The nozzle section 66 is placed at arbitrary positions and only the nozzle section 66 can be made to move freely, providing such a merit that a great amount of a gas-dissolved liquid can be produced easily.

The fifth embodiment of this invention will now be described with reference to FIGS. 6 to 8.

Figure 6:
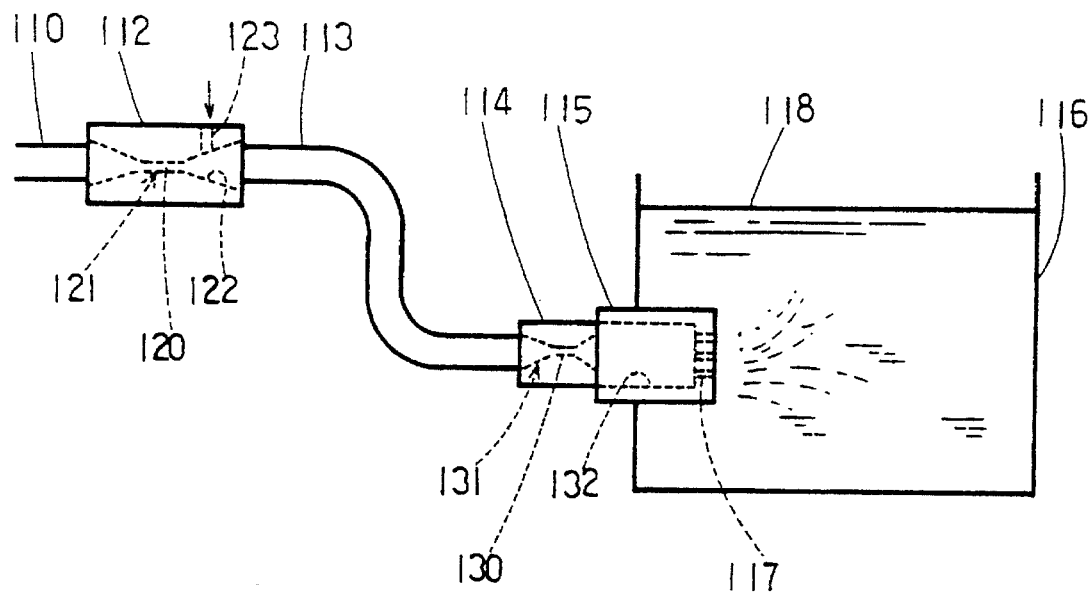
FIG. 6 is a pipe line diagram of the fifth embodiment of the gas-liquid dissolving and mixing apparatus according to this invention.

As shown in FIG. 6, a pipe 110 forming a fluid flow passage is connected to the upstream side of a mixing unit 112 for mixing a gas with a liquid, and the proximal end of a pipe or a tubular flow passage 113 is connected to the downstream side of the mixing unit 112. A nozzle section 115 is connected to the distal end of the pipe 113 by a re-distributing device 114. The nozzle section 115 is fixed to a lateral side wall of a water tank 116. The nozzle section 115 has a plurality of nozzle holes 117 opened to the interior of the water tank 116. A liquid 118 with which a gas is mixed in a dispersed state is stored in the water tank 116. The tubular passages 110 and 113 may be made from fixed pipes such as steel pipes, flexible pipes or the combination of these pipes.

Figure 7:
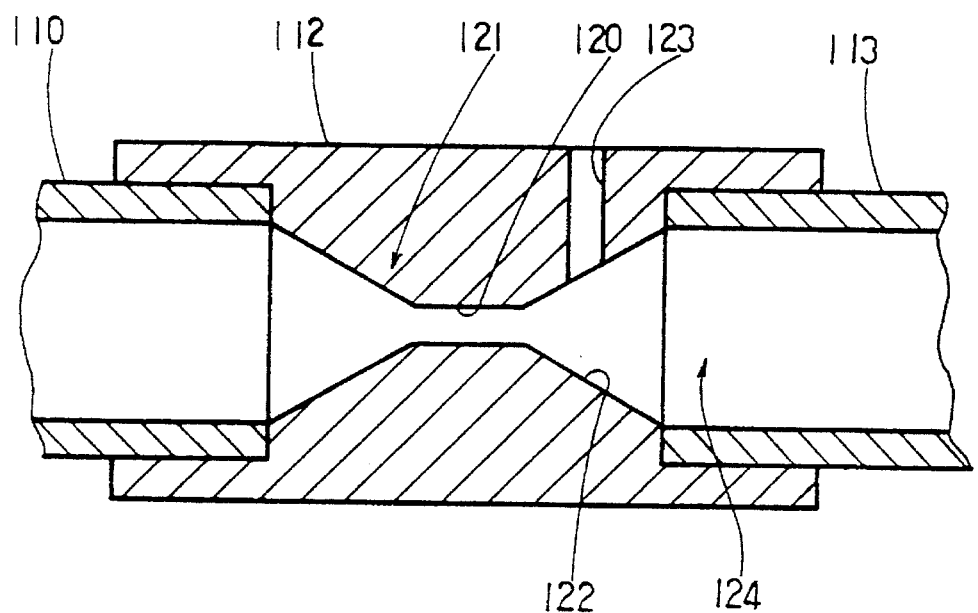
FIG. 7 is a cross sectional view of the mixing unit of the fifth embodiment of the gas-liquid dissolving and mixing apparatus according to this invention.

As shown in FIG. 7, the mixing unit 121 has a Venturi tube 121 provided at its center with a throat section 120. The Venturi tube 112 is formed by narrowing an intermediate portion of the fluid flow passage and forms a throttled section. A widened section 122 extends from the Venturi tube 121 toward the downstream side of the mixing unit 112. A gas inlet 123 for introducing the gas into the fluid flow passage is provided slightly downstream of the throat section 120. A mixing section 124 for mixing the gas introduced from the gas inlet 123 with the liquid in the fluid flow passage is provided downstream of the widened section 122. The size of the mixing section 124 is determined in accordance with the degree of the pressure therein. In this embodiment, the pipe 113 has an inner diameter equal to the largest diameter of the widened section 122 and extends coaxially from the largest part of the widened section 122 and the proximal end portion of the pipe 118 forms the mixing section 124.

Figure 8:
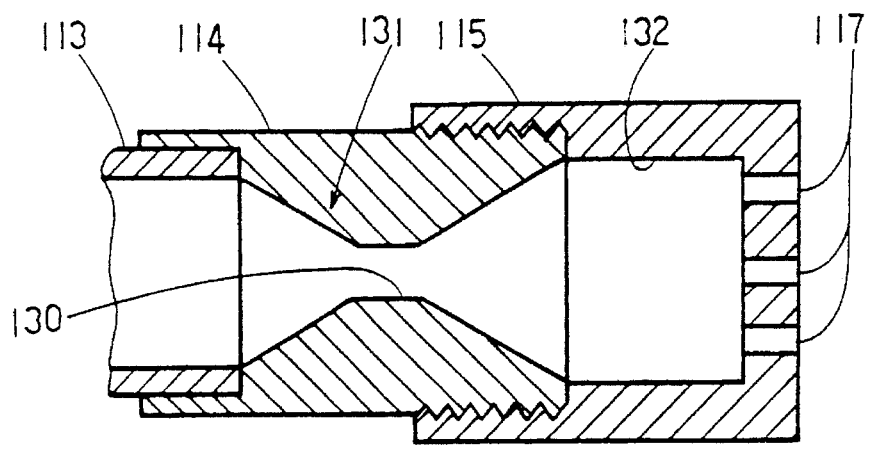
FIG. 8 is a cross sectional view of the redistributing device and the nozzle section of the fifth embodiment of the gas-liquid dissolving and mixing apparatus.

As shown in FIG. 8, a Venturi tube 131 is formed in the re-distributing device 114 connected to the downstream side of the mixing unit 112 via the tubular flow passage 113. The Venturi tube 131 is provided at its center with a throat section 130 forming a throttled section formed by narrowing an intermediate part of the fluid flow passage. To the downstream side of the Venturi tube 131 is connected a nozzle section 115 having a duct 132 defined by an inner space and nozzle hole 117 formed in the downstream end. Preferably, the distance between the nozzle holes 117 and the throat section 130 is about 2 to 10 times of the diameter of the duct 132. This is because re-mixing of the gas with the liquid is not fully carried out when the nozzle holes 117 are too close to the throat section 180 and the distribution of bubbles re-mixed with the liquid becomes uneven again when the nozzle holes 117 are too remote from the throat section 130. It was found experimentally that a good gas-mixed and dispersed liquid is produced when the cross sectional area of the throat section 180 is around 1.5 times of the total sectional area of the nozzle holes 117.

The operation of the fifth embodiment of the gas-liquid dissolving and mixing apparatus will now be described.

The liquid flowing into the mixing unit 112 is accelerated at the throat section 120 of the Venturi tube 121 and the static pressure of the liquid is lowered. As the liquid passes through the region of the widened section 122, the speed of the liquid decreases and the static pressure of the liquid increases again. Since the gas inlet 123 is disposed slightly downstream of the throat section 120 and pressure there is relatively negative, the gas flows into the fluid flow passage.

The gas introduced from the gas inlet 123 is formed into fine bubbles and flows together with the liquid in the fluid flow passage into the mixing section 124. The gas formed into bubbles is dissolved into the liquid due to the fact that the static pressure in the mixing section 124 is higher than the static pressure in the throat section 120. The bubbles and the liquid mixed together in the mixing section 124 pass through the pipe 113 and flow in the re-distributing device 114. The bubbles mixed with the liquid and passing through the tube 113 gradually rise in the pipe 113, and most of the bubbles are gathered in the upper portion of the pipe 113. As the liquid and the gas come to the re-distributing device 114 on the distal end of the pipe 113, they are accelerated again at the throat section 130 and are re-mixed together. Then, the liquid uniformly mixed with the gas is jetted from the nozzle holes 117. When the liquid passes through the nozzle holes 117, it is accelerated again. The static pressure exerted on the liquid is reduced and the gas is precipitated as fine bubbles from the liquid. Further, the bubbles which have not been dissolved in the liquid are divided by the turbulent flow when they are accelerated and jetted together with the liquid from the nozzle holes 117 as small bubbles.

Even when the bubbles are unevenly distributed in the liquid during the passing of the gas-liquid mixture through the pipe 113, the bubbles are uniformly dispersed in and mixed with the liquid before the gas-liquid mixture is jetted from the nozzle holes 117. Thus, the liquid in which the bubbles are evenly distributed is jetted from every nozzle hole 117.

In particular, the mixing unit 112 and the nozzle section 115 are separately provided and the gas supplying pipe 110 is connected to the mixing unit 112. Therefore, the pipe 113 can be made flexible such that the nozzle section 115 is not fixed to the water tank 116 but is made movable in the liquid 118. With this structure, therefore, the gas-liquid mixture can be jetted properly from the nozzle holes 117 by moving the nozzle section 115 in the liquid 118. The nozzle section 115 is handled with ease because the gas supplying pipe is not connected to the nozzle section 115.

Figure 9:
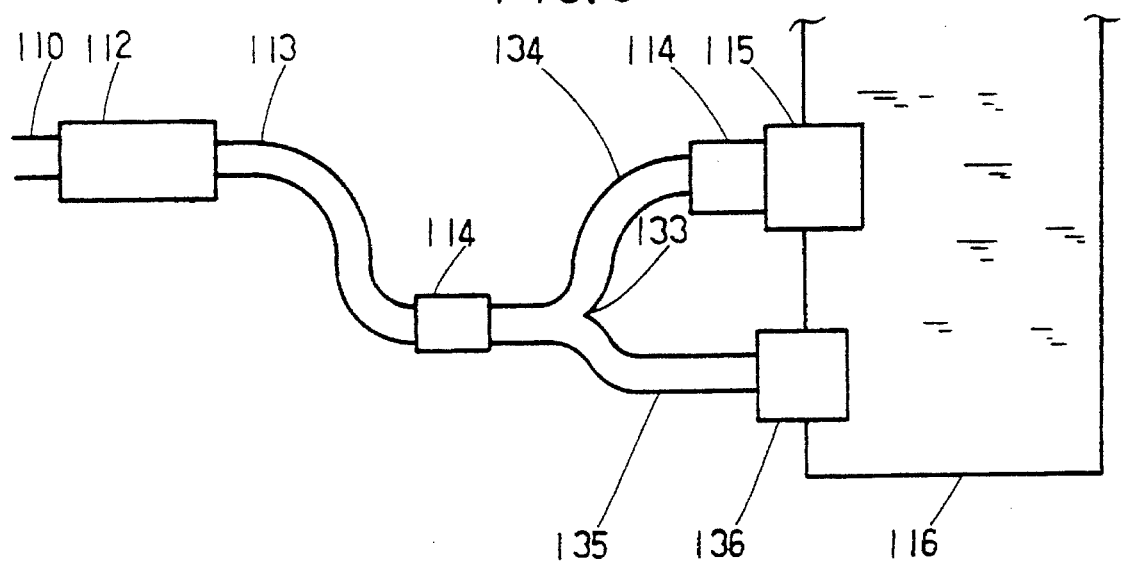
FIG. 9 is a general pipe line diagram of the sixth embodiment of the gas-liquid dissolving and mixing apparatus according to this invention.

The sixth embodiment of this invention will now be described with reference to FIG. 9. The same parts and elements of this embodiments as those of the fifth embodiment are designated by the same referential numerals and their description is omitted.

In the gas-liquid dissolving and mixing apparatus of the fifth embodiment, a branch portion 133 is formed on the distal end portion of the pipe 113. A re-distributing device 114 is provided just in front of the branch portion 133. Two pipes 134 and 135 extend toward the downstream side from the branch portion 133. Another re-distributing device 114 is provided at an intermediate section of the pipe 134 and the distal end of the pipe 134 is connected to a nozzle section 115 having a plurality of nozzle holes 117. The distal end of the pipe 135 is connected to a nozzle section 136 having a single nozzle hole. The nozzle section 136 having a single nozzle does not require a re-distributing device because the distribution of bubbles in a liquid jetted from a single nozzle hole cannot become uneven. The nozzle sections 115 and 136 may be fixed to the water tank 116. Alternatively, the pipes 113, 134 and 135 are made flexible such that the nozzle sections 115 and 136 are movable in the water tank 116.

Figure 10:
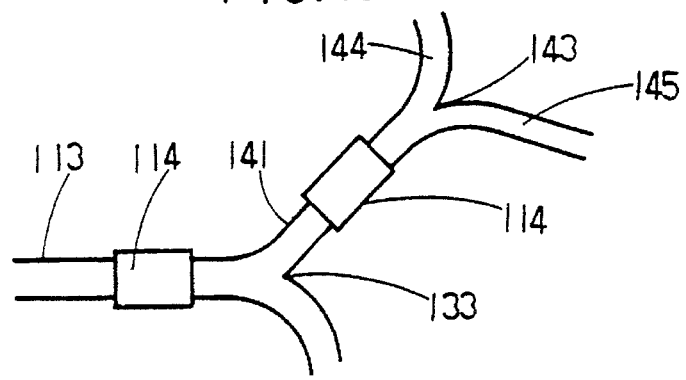
FIG. 10 is a partially broken view of the general pipe line diagram of the seventh embodiment of the gas-liquid dissolving and mixing apparatus according to this invention.

The seventh embodiment of this invention will now be described with reference to FIG. 10. The same parts and elements of this embodiments as those of the fifth embodiment are designated by the same referential numerals and their description is omitted.

A branch portion is formed on the distal end of a pipe 113, and another branch portion 143 is formed on the distal end of a pipe 141 branched from the pipe 113 at the branch portion 143. Just in front of the branching parts 133 and 143 are provided re-distributing devices 114, respectively. From the branch portion 143, two tubes 144 and 145 extend toward the downstream side.

Figure 11:
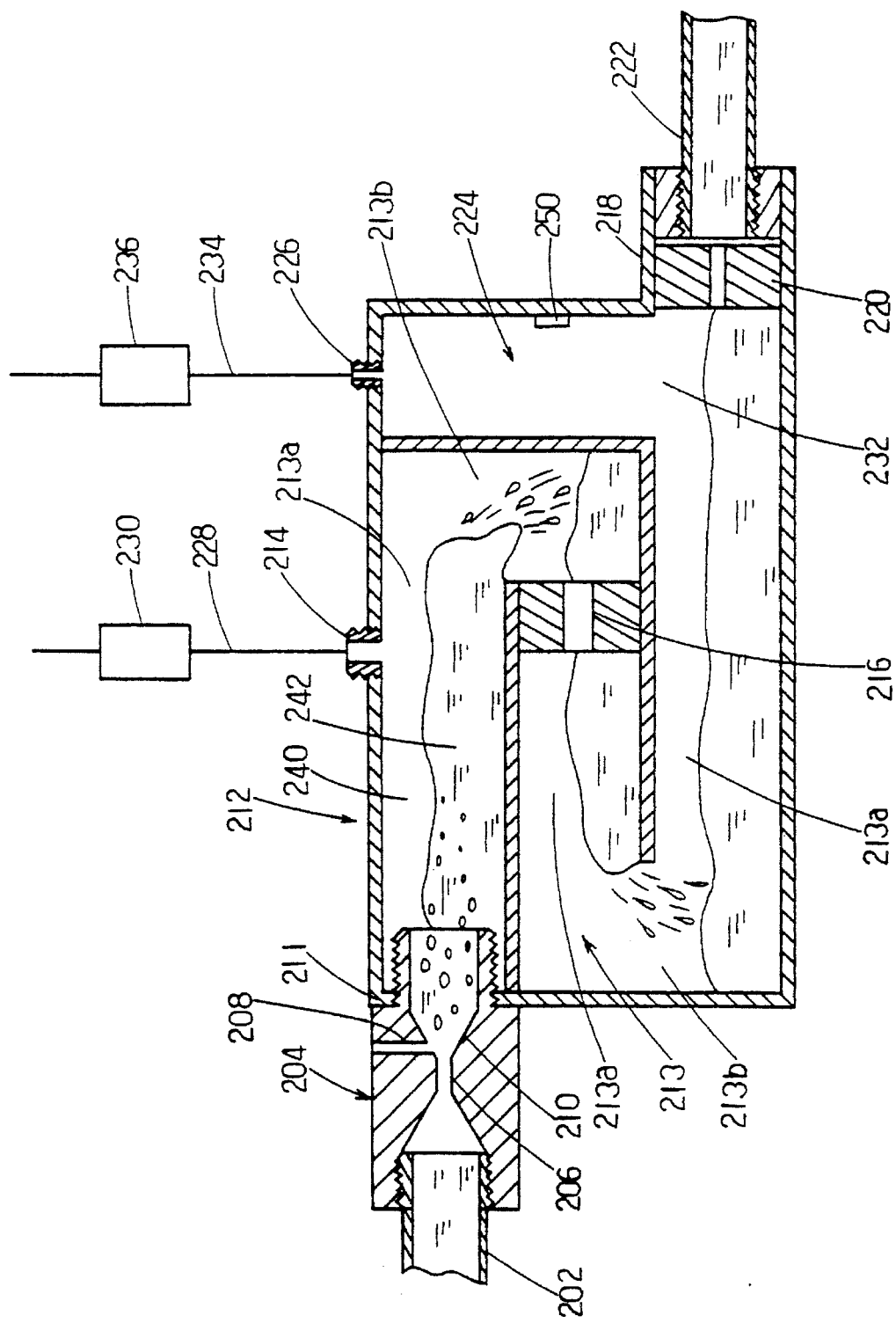
FIG. 11 is a longitudinal cross sectional view of the eighth embodiment of the gas-liquid dissolving and mixing apparatus according to this invention.

The eighth embodiment of this invention will now be described with reference to FIG. 11.

The gas-liquid dissolving and mixing apparatus of the eighth embodiment is provide with a gas-liquid pressure-mixing unit 212 having an inlet 211 to which a mixing unit 204 is connected. To the mixing unit 204 is connected a liquid introducing pipe 202. In the mixing unit 204 is formed a Venturi tube provided at its center with a throat section 206 formed by narrowing the fluid flow passage in the mixing unit 204. The throat section 206 forms a throttled section. Slightly downstream of the throat section 206 is provided a gas inlet 208 for introducing a gas into the fluid flow passage so as to cause the gas to be mixed with the liquid in the fluid flow passage.

The gas-liquid pressure-mixing unit 212 is of a box type and has a pressure-mixing flow passage 213 comprising three horizontal portions 213a and two vertical portions 213b which connect adjacent horizontal portions 213a together. The pressure-mixing flow passage 213 is provided, at its upper portion and its intermediate part, with an exhaust port 214 and an intermediate throttle 216, respectively. An outlet 218 of the unit 212 is provided with a nozzle hole 220 connected to a flowing-out pipe 222. An upright, branched flow passage 224 is formed in the unit 212 just in front of the outlet 218. On the upper portion of the branched Flow passage 224 is formed a release port 226 for exhausting excess gas.

A valve 230 is connected to the exhaust port 214 formed on the upper portion off the gas-liquid pressure-mixing unit 212. When the flow of the gas-liquid mixture into the unit 212 is interrupted, the exhaust port 214 and the valve 230 act to prevent the pressurized gas from being expanded in the unit 212 and from flowing in the flowing-in pipe 202, the gas inlet 208 and/or the flowing-out pipe 222. In other words, when the introduction of the gas-liquid mixture into the unit 212 stops, the valve 230 opens and the gas is exhausted from the exhaust port 214 to the outer atmosphere. If the exhaust port 214 is not required, it can be omitted.

The total cross sectional area of the intermediate throttle 216 provided in the intermediate part of the fluid flow passage in the gas-liquid pressure-mixing unit 212 is larger than the total cross sectional area of the nozzle hole 220 provided on the outlet 218 of the unit 212. Since the intermediate throttle 216 is provided, the pressure in the portion of the fluid flow passage behind the intermediate throttle 216 is smaller than the pressure in the portion of the fluid flow passage in front of the intermediate throttle 216. Accordingly, an abnormal condition such as an abnormally high pressure in the pressure-mixing flow passage 213 can be detected by measuring the pressures in the portions of the fluid flow passage in front of and behind the intermediate throttle 216, thereby preventing accidents such as breakage of the unit 212 in advance. In general, an abnormality is noticed as the pressure of the portion of the fluid flow passage behind the intermediate throttle 216 approaches the pressure of the portion of the fluid flow passage in front of the intermediate throttle 216. In this embodiment, the pressure in the portion of the fluid flow passage in front of the intermediate throttle 216 is detected as the pressure of the gas-liquid mixture flowing in this portion. When the pressure of the portion of the fluid flow passage behind the intermediate throttle 216 is measured by means of a pressure sensor 250 and is compared with the pressure of the portion of the flow portion in front of the intermediate throttle 216, it can be known whether abnormality occurs to the gas-liquid pressure-mixing unit 212. If not required, the intermediate throttle may be omitted.

The branched fluid flow passage 224 is branched from a branch portion 232 at the downstream end of the pressure-mixing flow passage 213 disposed just before the nozzle hole 220 and extends upward. The passage 224 is connected via the release port 226 to the flow control valve 236 by means of a pipe 234. The density of the gas flowing through the pressure-mixing flow passage 213 is small. Thus, when the gas arrives at the branch portion 232, it flows into the upward extending branched liquid passage 224 and then flows into the flow control valve 236 through the pipe 234. By regulating the flow control valve 236, the exhaust of excess gas and the adjustment of the pressure of the gas can be carried out simultaneously. If not required, the branched flow passage 224 may be omitted. When it is unnecessary to control the pressure in the pressure-mixing liquid passage 213, the flow control valve 236 may be replaced by a Fixed throttle.

The operation of the gas-liquid dissolving and mixing apparatus will now be described.

The liquid flowing from the flow-in tube 202 into the mixing unit 204 under a predetermined pressure is accelerated at the throat section 206 and its static pressure decreases. Then, as the gas passes through the widened section 210, its speed is reduced and its static pressure increases again. Because the gas inlet 208 is disposed just downstream of the throat section 206 and the pressure in this portion is relatively negative, the gas flows in the fluid flow passage. The gas-liquid mixture produced in the mixing unit 204 is divided into two flows in the gas-liquid pressure-mixing unit 212. One flows as a gas flow 240 and the other flows as a liquid flow 242 through the unit 212. In this state, the gas and the liquid contact with each other in a large contacting area under pressure, and thus chemical reaction occurring between the gas and the liquid and dissolution of the gas into the liquid are accelerated. Thereafter, the gas-liquid mixture flows into the flowing-out pipe 222 through the nozzle hole 220. Since the flowing-out pipe 222 is disposed below the flowing-in pipe 202, the gas-liquid mixture stays in the pressure-mixing flow passage 213. As the density of the liquid is larger than the density of the gas, the liquid flows out much more easily than the gas, and thus more gas stays in the passage 213. Even if, therefore, the ratio of the gas to the liquid in the gas-liquid mixture introduced into the gas-liquid pressure-mixing unit 212 is small, this ratio becomes large in the unit 212.

In the gas-liquid dissolving and mixing apparatus of the eighth embodiment, the relation between the cross sectional area of the part of the widened section 21 at the gas inlet 208 and the total cross sectional area of the nozzle hole 220 can be given by the following expressions:

$$P_A < P_G \tag{1}$$

$$P_A = (1 - S_b^2/S_a^2)P_1 + (\delta P + P_b)S_b^2/S_a^2 \tag{2}$$

where $P_G$ is the pressure of the gas introduced from the gas inlet 8;

$P_A$ is the static pressure in the portion of the widened section 210 at the gas inlet 208, which static pressure is given by the Bernoulli's Theorem and the equation of continuity in the hydrodynamics;

$S_A$ is the cross sectional area of the portion of the widened section 210 at the gas inlet 208;

$S_b$ is the total cross sectional area of the nozzle hole 220:

$P_1$ is the total pressure in the portion of the widened portion 210 at the gas inlet 208;

$\delta P$ is the pressure loss between the portion of the widened section 210 at the gas inlet 208 and the nozzle hole 220; and $P_b$ is the static pressure at the nozzle hole 220.

Experiments for treating foul water treated by mixing ozone with the water performed by using the apparatus of the eighth embodiment show that 99.4% of injected ozone was used For the treatment. This is a very high ozone-usage efficiency. Since the gas-liquid pressure-mixing unit 212 is of a box type and the pressure-mixing flow 213 takes an interdigital form, the unit 212 has a simple and small structure and provides high efficiency of mixing a gas with a liquid.

The ninth embodiment of this invention will now be described.

Figure 12:
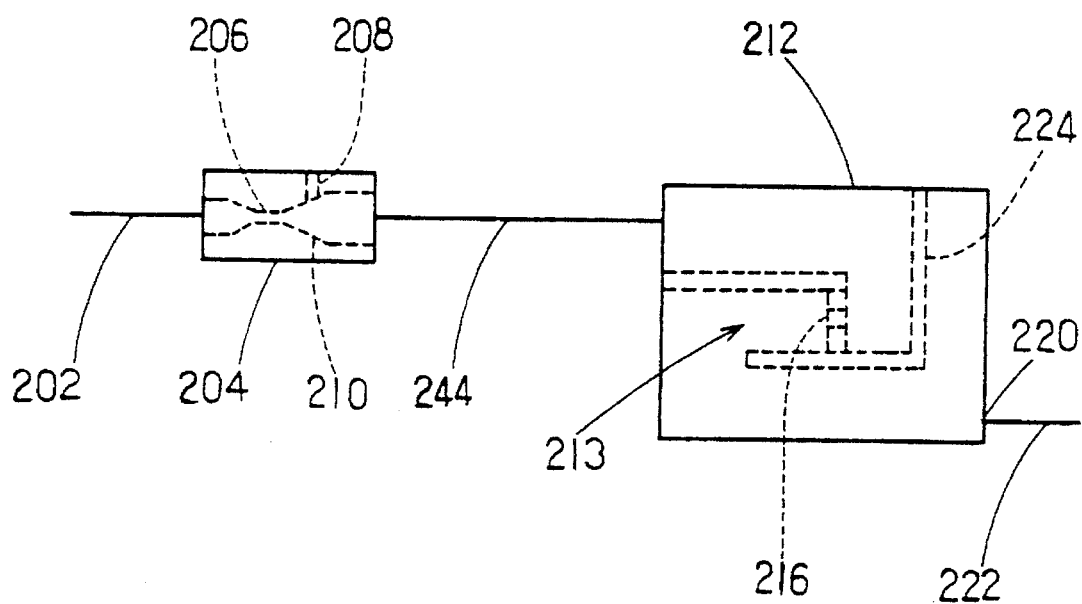
FIG. 12 is a general pipe line diagram of the ninth embodiment of the gas-liquid dissolving and mixing apparatus according to this invention.
Figure 13:
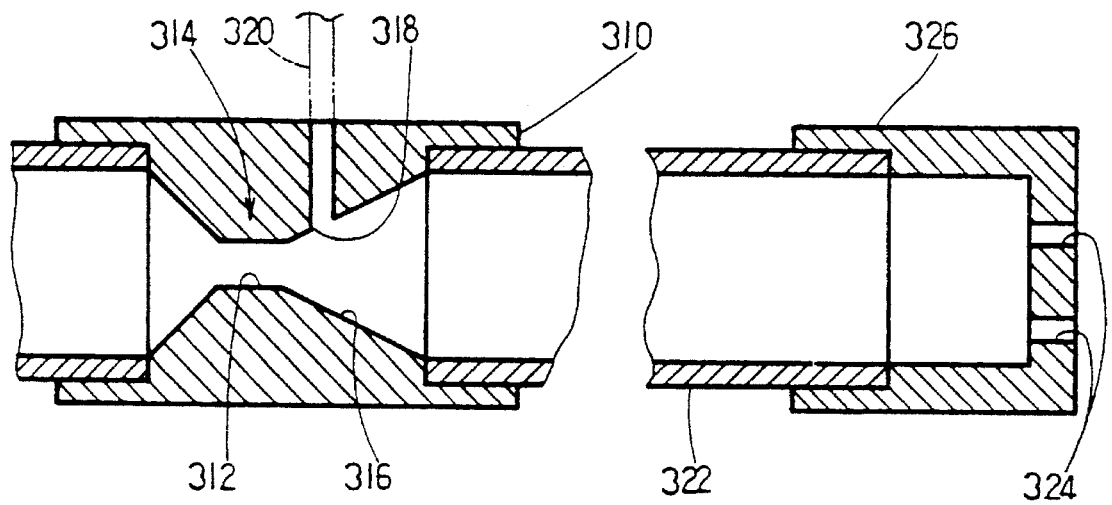
FIG. 13 is a longitudinal cross sectional view of the tenth embodiment of the gas-liquid dissolving and mixing apparatus according to this invention.

As shown in FIG. 12, a mixing unit 204 is connected to a gas-liquid pressure-mixing unit 212 by a pipe 244. A nozzle hole 220 may be provided in the distal end or an intermediate portion of a flowing-out pipe 222. Preferably, a pressure-mixing flow passage 213 of the unit 212 may have repeated steep and gentle slopes through which the gas-liquid mixture flows. For example, the passage 213 may be a meandering tubular element such as a meandering pipe.

The tenth embodiment of this embodiment will now be described with reference to FIGS. 13 to 16.

Formed in a gas-liquid dissolving and mixing unit 310 for mixing a gas such as air with a liquid such as water is a Venturi tube 314 provided at its center with a throat section 312 forming a throttled section. A widened section 316 is formed downstream of the Venturi tube 314. In a portion of the widened section 316 just downstream of the throat section 312 is formed a gas inlet 318 for mixing a gas or air, introduced from the exterior of the unit 310 into a fluid flow passage formed in the unit 310, with the liquid in the fluid flow passage. The distal end of a pipe 320 is connected to the gas inlet 318. To the downstream end of the widened section 316 is connected a pipe 322 which forms a mixing section for mixing the gas introduced from the gas inlet 318 with the liquid in the fluid flow passage in a relatively pressurized state and a transfer section for transporting the gas-liquid mixture as well. The pipe 322 may be made from a steel pipe or a flexible pipe and its outer diameter can be determined according to the pressure difference between the throat section 312 and the pipe 322. In this embodiment, the pipe 322 extends from the largest diameter portion of the widened section 316. A nozzle section 326 having a plurality of nozzle holes 324 is fixed to the distal end of the pipe 322.

Figure 16:
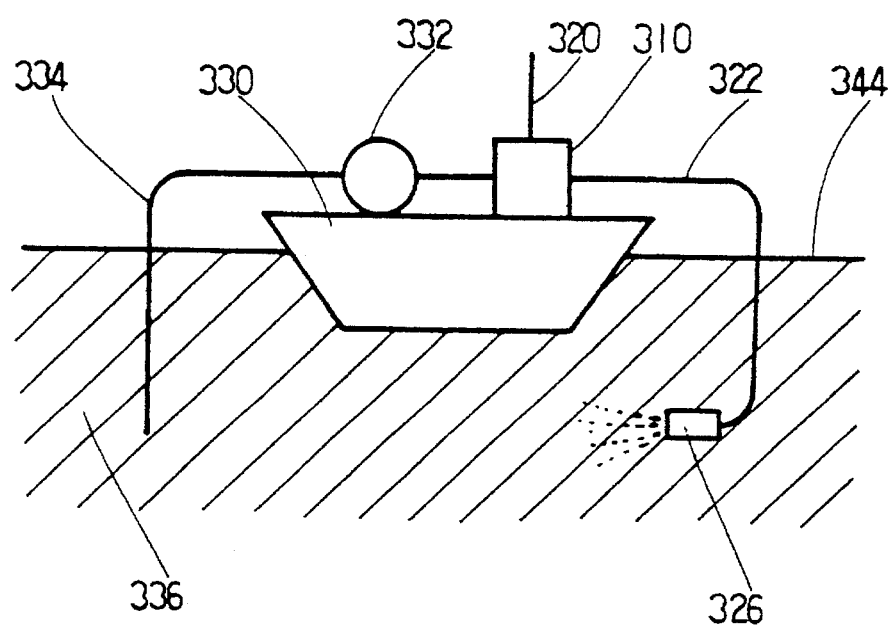
FIG. 16 is a general view of a suspended particle floating and separating device of the tenth embodiment of this invention.

As shown in FIG. 16, the gas-liquid dissolving and mixing apparatus of the tenth embodiment has a gas-liquid dissolving and mixing unit 310 mounted on a ship or a boat 330 on a lake or a swamp and used as a floating type suspended particle separator for floating and separating suspended particles. Water 336 of the lake or the swamp is sucked by a pump 332 through a suction pipe 334 and supplied to the unit 310. The nozzle section 326 provided on the distal end of the pipe 322 is disposed in the deep part of the water 336 in which suspended particles are distributed. In place of the nozzle section 326, a gas-liquid mixture discharging section extended from the nozzle section 326 by a steel pipe or a flexible pipe may be disposed in the water 336.

The operation of the gas-liquid dissolving and mixing apparatus of the tenth embodiment will now be described.

First, lake water 336 is sucked by the pump 322 through the suction pipe 334 and supplied under pressure to the gas-liquid dissolving and mixing unit 310. The water flowing in the unit 310 is accelerated at the throat section 312 of the Venturi tube 314 and its static pressure is reduced. As the water flows through the widened portion 316, the speed of the water flow is reduced and its static pressure increases again. Since the gas inlet 318 is disposed slightly downstream of the throat section 312 and the static pressure in this part is relatively negative, air flows in the fluid flow passage.

The air introduced from the gas inlet 318 is formed into bubbles and flows together with the water into the pipe 322. The bubbles are dissolved into the water because the static pressure in the pipe 322 is higher than the static pressure in the throat section 312. The gas-water mixture passes through the pipe 322 and is jetted from the nozzle holes 324. As the gas-water mixture passes through the nozzle holes 324, the water is accelerated again. Thus, its static pressure is lowered and the air dissolved in the water is separated as fine bubbles having a diameter of several micrometers to several ten micrometers. The bubbles which have not yet been dissolved in the water are divided into small bubbles having a diameter of several ten to several hundred micrometers by turbulent flow generated when they are accelerated in the nozzle holes 324. Accordingly, the fine bubbles, having a wide range of diameter from several micrometers to several hundred micrometers, jetted from the gas-liquid dissolving and mixing unit 310 are dispersed in the water 336 in the lake.

Figure 14:
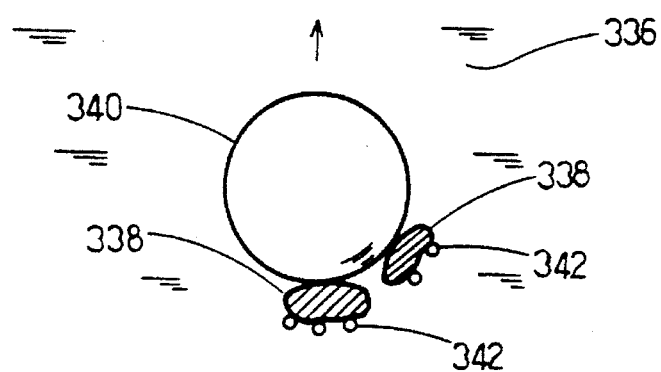
FIG. 14 illustrates how suspended particles float in the tenth embodiment of this invention.
Figure 15:
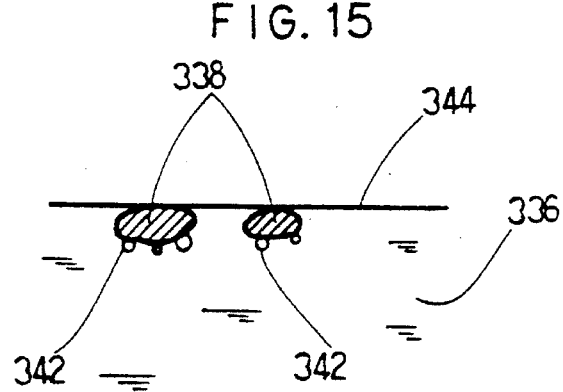
FIG. 15 shows that the suspended particles are in a floating state in the tenth embodiment of this invention.

As shown in FIG. 14, the bubbles discharged in the lake water 336 are attached to suspended particles 338. The bubbles attached to the suspended particles 338 have a variety of sizes from relatively large ones 340 to relatively small ones 342, as shown. The suspended particles 338 attached by the bubbles 340 and 342 float due to buoyancy of the large bubbles 340 until the suspended particles 338 arrive at a vicinity of the water surface. As shown in FIG. 15, the large bubbles 340 are separated from the suspended particles 338 at the water surface and discharged into the atmosphere. Since, however, the small bubbles 342 are still adhered to the suspended particles 338, the suspended particles 338 stay slightly under the water surface.

Experiments for floating water blooms were performed by using the floating type suspended particle separator according to the tenth embodiment. It was observed with a video microscope that particles of water blooms were absorbed by large bubbles and rose to the water surface quickly, the large bubbles were separated from the water blooms and then the particles of water blooms were retained by small bubbles attached to the particles slightly under the water surface.

With the floating type suspended particle separator of this embodiment, the gas-liquid dissolving and mixing unit 310 allows for producing bubbles having a wide range of diameters, thereby floating suspended particles efficiently. Further, suspended particles which have already floated can be retained without fail just under the water surface such that the suspended particles can be removed efficiently.

Figure 17:
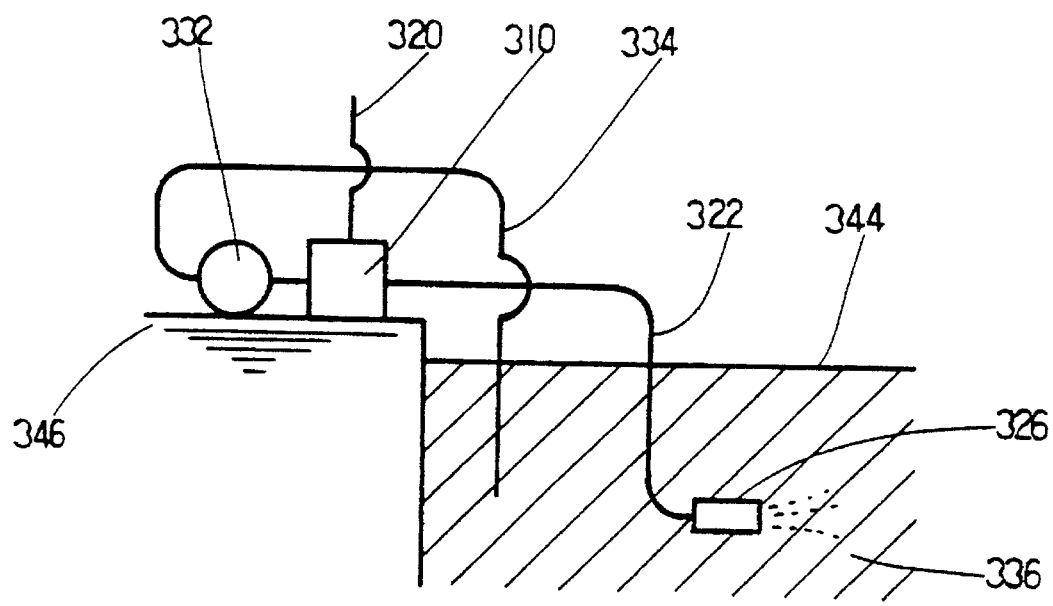
FIG. 17 is a general view of the eleventh embodiment according to this invention.

The eleventh embodiment of this invention will now be described with reference to FIG. 17. The same parts and elements of this embodiment as those of the above-mentioned embodiments are designated by the same referential numerals and their description is omitted.

The floating type suspended particle separator of this embodiment has a gas-liquid dissolving and mixing unit 310 provided on the land 346 and a nozzle section 326 connected to the unit 310 by the pipe 322 and disposed in water. Alternatively, the nozzle section 326 may be placed on the land or on the water to which one end of a pipe is connected, and a discharge section to which the other end of the pipe is connected may be disposed in the water. The pipe may be a steel pipe or a flexible pipe.

Figure 18:
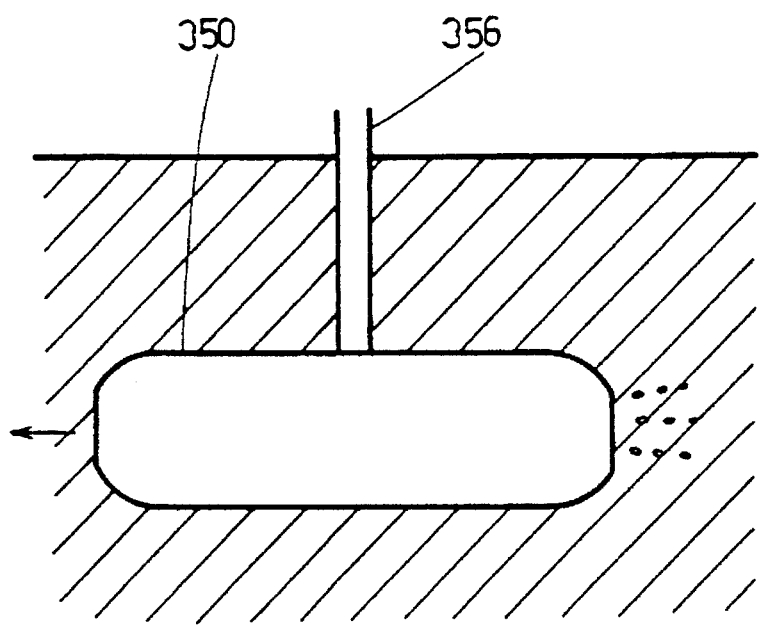
FIG. 18 is a general view of a suspended particle floating and separating device of the twelfth embodiment of this invention.
Figure 19:
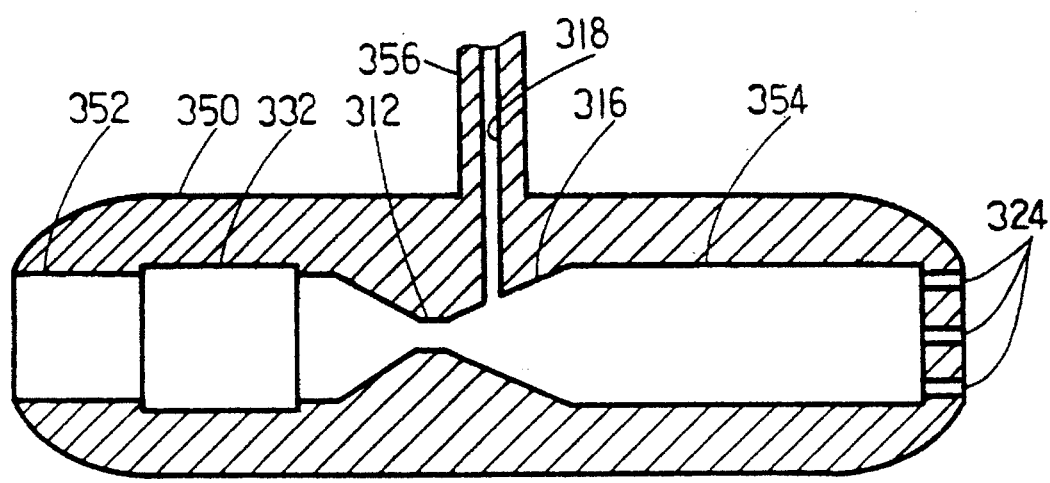
FIG. 19 is a cross sectional view of the suspended particle floating and separating device of the twelfth embodiment of this invention.

The twelfth embodiment of this invention will now be described with reference to FIGS. 18 and 19. The same parts and elements of this embodiment as those of the tenth embodiment are shown by the same referential numerals and their description is omitted.

The floating type suspended particle separator of this embodiment has a main body 350 which is disposed in water and in which are formed a liquid outlet 352, a pump 332, a throat section 312, a widened section 316, a mixing section 354 for mixing a gas with a liquid and nozzle holes 324 formed in the distal end of the mixing section 354. In the widened section 316 is formed a gas inlet 318 connected to an end of a gas sucking pipe 356.

The overall size of the floating type suspended particle separator of this embodiment can be made small. The gas sucking pipe 356 can be omitted by providing an air cylinder in the main body 350. Further, the separator is propelled by the reaction force of the gas-liquid mixture jet in an opposite direction to the direction of the jet. Thus, the liquid is sucked in the main body 350 efficiently. When a rudder is provided, the separator can be moved freely in the water.

Each of the gas-liquid dissolving and mixing apparatuses according to this invention can be applied not only to an apparatus for producing bubbles but also to an apparatus for dissolving a gas into a liquid. The throttled portion may be a Venturi tube or an orifice which is sharply throttled and its shape is not questioned. The shape of the nozzle hole or nozzle holes and the number of the nozzle holes can be selected in accordance with the required conditions.

Industrial Applicability

The method and apparatus for dissolving a gas into and mixing the same with a liquid is applicable to a method and an apparatus for producing ozone water, an apparatus for treating foul water by dissolving a gas such as ozone into the liquid, an apparatus for dispersing a great amount of bubbles in a liquid, and the like apparatus. As compared with the conventional method and apparatus, the method and apparatus of this invention enables a gas to be dissolved in a liquid efficiently and bubbles to be formed in the liquid efficiently. The method and apparatus of this invention is also applicable to a method and an apparatus for floating and separating suspended particles, whereby, for example, pigment-particles can be removed from ink or paint and ink can be removed from paper material during the process of manufacturing regenerated paper. A chemical agent such as a coagulant agent, a floating surface-active agent or a neutralizer can be mixed with a liquid along with bubbles. The chemical agent may be sucked in the liquid together with the gas by using a gas supplying pipe. A plurality of gas inlets or chemical agent inlets may be provided in order to facilitate the injection of the chemical agent.

We claim:

1. An apparatus for mixing a gas with a liquid and for dissolving the gas into the liquid under pressure, comprising:
    a fluid flow passage;
    a throttled section formed in said fluid flow passage;
    a widened section having a gradually increased diameter and which is continuous with said throttled section;
    a gas inlet provided in a portion of said widened section slightly downstream of said throttled section;
    a mixing section having an outlet and provided downstream of said widened section, for mixing a gas introduced from said gas inlet with a liquid in said fluid flow passage, said mixing section dissolving gas, which has been mixed with the liquid, into the liquid by pressurizing the liquid, with the gas mixed therein, in said mixing section; and
    a nozzle section, having nozzle holes (22), provided on said outlet of said mixing section for outputting said liquid with said gas dissolved therein; and
    wherein each of said nozzle holes (22) is formed so as to jet bubbles dispersed in said liquid containing suspended particles, each of said nozzle holes (22) having a diameter of several micrometers to several hundred micrometers.

2. An apparatus for mixing a gas with a liquid and for dissolving the gas into the liquid under pressure, comprising:
    a fluid flow passage;
    a throttled section formed in said fluid flow passage;
    a widened section having a gradually increased diameter and which is continuous with said throttled section;
    a gas inlet provided in a portion of said widened section slightly downstream of said throttled section;
    a mixing section having an outlet and provided downstream of said widened section, for mixing a gas introduced from said gas inlet with a liquid in said fluid flow passage, said mixing section dissolving gas, which has been mixed with the liquid, into the liquid by pressurizing the liquid, with the gas mixed therein, in said mixing section; and
    a nozzle section, having at least one nozzle hole (22), provided on said outlet of said mixing section for outputting said liquid with said gas dissolved therein; and
    wherein a total cross sectional area of said at least one nozzle hole is smaller than a cross sectional area of said throttled section, whereby the liquid in said mixing section is pressurized.

3. The apparatus according to claim 2, wherein said nozzle section has a plurality of nozzle holes (22).

4. The apparatus according to claim 2, wherein each of said at least one nozzle hole (22) is formed so as to jet bubbles dispersed in said liquid containing suspended particles, each of said at least one nozzle hole (22) having a diameter of several micrometers to several hundred micrometers.

5. The apparatus according to claim 3, wherein said throttled section and said nozzle section are connected together by a pipe which also forms at least part of said mixing section.

6. An apparatus according to claim 3, wherein the cross sectional area of said throttled section is around 1.5 times the total cross sectional area of said nozzle holes.

7. An apparatus according to claim 2, wherein the cross sectional area of said throttled section is around 1.5 times the total cross sectional area of said at least one nozzle hole.

8. An apparatus for mixing a gas with a liquid and for dissolving the gas into the liquid under pressure, comprising:
    a throttled section (206) formed by throttling a portion of a fluid flow passage;
    a widened section (210) formed by a gradually widening downstream portion of said fluid flow passage;
    a gas inlet (208) provided slightly downstream of said throttled section (206), for introducing a gas into said fluid flow passage;
    a mixing section (212) comprising a pressure-mixing flow passage (213) which has horizontal portions (213a) and vertical portions (213b) which connect adjacent horizontal portions (213a) together, said mixing section (212) being provided downstream of said widened section (210), said mixing section defining a flow path for a gas (240) and a flow path for a liquid (242), the gas and liquid being in contact with each other under a same pressure, for dissolving the gas, which has been mixed with the liquid, into the liquid by pressurizing the liquid, with the gas mixed therein, in said mixing section; and
    at least one nozzle hole (220) formed on said outlet or said downstream end of said pressure-mixing flow passage (213).

9. The apparatus according to claim 8, further comprising:
    an intermediate throttle (216), having a cross sectional area larger than a cross sectional area of said at least one nozzle hole (220), provided in an intermediate portion of said pressure-mixing flow passage (213); and
    pressure measuring means (250) for measuring a pressure at least in a portion of said pressure-mixing flow passage (213), said pressure measuring means being arranged at an outlet side of said intermediate throttle (216).

10. An apparatus for mixing a gas with a liquid and for dissolving the gas into the liquid under pressure, comprising:
    a fluid flow passage;
    a throttled section formed in said fluid flow passage;
    a widened section having a gradually increased diameter and which is continuous with said throttled section;
    a gas inlet provided in a portion of said widened section slightly downstream of said throttled section;
    a mixing section having an outlet and provided downstream of said widened section, for mixing a gas introduced from said gas inlet with a liquid in said fluid flow passage, said mixing section dissolving gas, which has been mixed with the liquid, into the liquid by pressurizing the liquid, with the gas mixed therein, in said mixing section; and a nozzle section, having nozzle holes (22) provided on said outlet of said mixing section for outputting said liquid with said gas dissolved therein; and wherein said widened section has a cross sectional area ($S_A$) at its connecting portion with said gas inlet which has a relation to the total cross sectional area ($S_B$) of the nozzle holes (22), such that:

$$P_A > P_G$$

and $$P_a = (1 - S^2_B/S^2_A)P_1 + (\delta P + P_B)S^2_B/S^2_A$$

where $P_1$ is the total pressure in the widened section at its connecting portion to the gas inlet;

$\delta P$ is the pressure loss between the widened section at its connecting portion to the gas inlet and the nozzle holes;

$P_B$ is the static pressure at the outlets of the nozzle holes; and $P_G$ is the pressure of the gas flowing from the gas inlet.

11. The apparatus according to claim 10, wherein each of said nozzle holes is formed so as to jet bubbles dispersed in said liquid containing suspended particles, each of said nozzle holes having a diameter of several micrometers to several hundred micrometers.

12. An apparatus for mixing a gas with a liquid and for dissolving the gas into the liquid under pressure, comprising:

a liquid supplying section (30) for supplying a liquid under a predetermined pressure and into which liquid a predetermined gas is to be dissolved;

a mixing unit (10) for mixing said gas with said liquid supplied under pressure from said liquid supplying section, said mixing unit (10) comprising;

a throttled section formed in a fluid flow passage, a gas inlet provided slightly downstream of said throttled section;

a gradually widened section continuous with said throttled section;

a mixing section having an outlet and provided downstream of said widened section, for mixing said gas introduced from said gas inlet with said liquid in said fluid flow passage, said mixing section dissolving gas, which has been mixed with the liquid, into the liquid by pressurizing the liquid, with the gas mixed therein, in said mixing section, and a nozzle section, having nozzle holes (22), provided on said outlet of said mixing section;

a gas supplying section (44) connected to said gas inlet of said mixing unit (10);

a liquid storing section (38) to which said nozzle section of said mixing unit (10) is connected and into which said liquid with said gas dissolved thereinto flows; and wherein said widened section has a cross sectional area ($S_A$) at its connecting portion with said gas inlet which has a relation to the total cross sectional area ($S_B$) of the nozzle holes (22), such that:

$$P_A < P_G$$

and $$P_A = (1 - S^2_B/S^2_A)P_1 + (\delta P + P_B)S^2_B/S^2_A$$

where $P_1$ is the total pressure in the widened section at its connecting portion to the gas inlet;

$\delta P$ is the pressure loss between the widened section at its connecting portion to the gas inlet and the nozzle holes;

$P_B$ is the static pressure at the outlets of the nozzle holes; and $P_G$ is the pressure of the gas flowing from the gas inlet.

13. The apparatus according to claim 12, wherein said mixing unit (10) further comprises:

a main body (52) provided with said throttled section, at least one nozzle section (54), and a pipe (56) also functioning as said mixing section and connecting said at least one nozzle section (54) to said main body (52).

14. The apparatus according to claim 12, wherein each of said nozzle holes is formed so as to jet bubbles dispersed in said liquid containing suspended particles, each of said nozzle holes having a diameter of several micrometers to several hundred micrometers.

15. An apparatus for mixing a gas with a liquid and for dissolving the gas into the liquid under pressure, comprising:

a first throttled section (120) formed by a portion of a fluid flow passage whose cross sectional area is reduced;

a widened section (122) continuous with said first throttled section (120) and formed by a gradually widening part of said fluid flow passage toward a downstream side thereof;

a gas inlet (123) provided in a portion of said widened section (122) slightly downstream of said first throttled section (120);

a mixing section (124) having a downstream end and provided downstream of said widened section (122), for mixing a gas introduced from said gas inlet (123) with a liquid in said fluid flow passage, said mixing section dissolving gas, which has been mixed with the liquid, into the liquid by pressurizing the liquid, with the gas mixed therein, in said mixing section;

a liquid pipe (113) having a distal end and a proximal end connected to said downstream end of said mixing section (124);

a nozzle section (115), having a plurality of nozzle holes (117), and connected to said distal end of said liquid pipe (113); and a second throttled section (130) formed by a portion of said fluid flow passage whose cross sectional area is reduced and which is provided just in front of said nozzle section (115); and wherein said widened section (122) has a cross sectional area ($S_A$) at its connecting portion with said gas inlet (123) which has a relation to the total cross sectional area ($S_B$) of the nozzle holes (117), such that:

$$P_A < P_G$$

and $$P_A = (1 - S^2_B/S^2_A)P_1 + (\delta P + P_B)S^2_B/S^2_A$$

where $P_1$ is the total pressure in the widened section at its connecting portion to the gas inlet;

δ P is the pressure loss between the widened section at its connecting portion to the gas inlet and the nozzle holes;

$P_B$ is the static pressure at the outlets of the nozzle holes; and $P_G$ is the pressure of the gas flowing from the gas inlet.

16. The apparatus according to claim 15, wherein said liquid pipe (113) comprises a flexible pipe.

17. The apparatus according to claim 15, wherein each of said nozzle holes is formed so as to jet bubbles dispersed in said liquid containing suspended particles, each of said nozzle holes having a diameter of several micrometers to several hundred micrometers.

18. An apparatus for mixing a gas with a liquid and for dissolving the gas into the liquid under pressure, comprising a first throttled section (120) formed by a portion of a fluid flow passage whose cross sectional area is reduced;

a widened section (122) continuous with said first throttled section (120) and formed by a gradually widened part of said fluid flow passage toward a downstream side of said fluid flow passage;

a gas inlet (123) provided in a portion of said widened section (122) slightly downstream of said first throttled section (120);

a mixing section (124) having a downstream end and provided downstream of said widened section (122), for mixing a gas introduced from said gas inlet (123) with a liquid in said fluid flow passage, said mixing section dissolving gas, which has been mixed with the liquid, into the liquid by pressurizing the liquid, with the gas mixed therein, in said mixing section;

a liquid pipe (134) having a branch portion (133) and connected to said downstream end of said mixing section (124);

nozzle sections (115) provided downstream of said branch section (133), and each of said nozzle sections (115) having a plurality of nozzle holes (117); and a second throttled section (130) formed by a portion of said fluid flow passage whose cross sectional area is reduced and provided just in front of said branch portion (133); and wherein said widened section has a cross sectional area ($S_A$) at its connecting portion with said gas inlet which has a relation to the total cross sectional area ($S_B$) of the nozzle holes, such that:

$$P_A < P_G$$

and $$P_A = (1 - S^2_B/S^2_A)P_1 + (\delta P + P_B)S^2_B/S^2_A$$

where $P_1$ is the total pressure in the widened section at its connecting portion to the gas inlet;

δ P is the pressure loss between the widened section at its connecting portion to the gas inlet and the nozzle holes;

$P_B$ is the static pressure at the outlets of the nozzle holes; and $P_G$ is the pressure of the gas flowing from the gas inlet.

19. The apparatus according to claim 18, wherein said liquid pipe (134) comprises a flexible pipe.

20. The apparatus according to claim 18, wherein each of said nozzle holes is formed so as to jet bubbles dispersed in said liquid containing suspended particles, each of said nozzle holes having a diameter of several micrometers to several hundred micrometers.

21. An apparatus for mixing a gas with a liquid and for dissolving the gas into the liquid under pressure, comprising;

a throttled section (206) formed by throttling a portion of a fluid flow passage;

a widened section (210) formed by 2 gradually widening downstream portion of said fluid flow passage;

a gas inlet (208) provided slightly downstream of said throttled section (206), for introducing a gas into said fluid flow passage;

a mixing section (212) comprising a pressure-mixing flow passage (213) which has horizontal portions (213*a*) and vertical portions (213*c*) which connect adjacent horizontal portions (213*a*) together, said mixing section (212) being provided downstream of said widened section (210) said mixing section (212) defining a flow path for a gas (240) and a liquid (242) which are in contact with each other under pressure, for dissolving the gas, which has been mixed with the liquid, into the liquid by pressurizing the liquid, with the gas mixed therein, in said mixing section; and at least one nozzle hole (220) formed on said outlet or said downstream end of said pressure-mixing flow passage (213); and wherein said widened section has a cross sectional area ($S_A$) at its connecting portion with said gas inlet which has a relation to the total cross sectional area ($S_B$) of the at least one nozzle hole, such that:

$$P_A < P_G$$

and $$P_A = (1 - S^2_B/S^2_A)P_1 + (\delta P + P_B)S^2_B/S^2_A$$

where $P_1$ is the total pressure in the widened section at its connecting portion to the gas inlet;

δ P is the pressure loss between the widened section at its connecting portion to the gas inlet and the at least one nozzle hole;

$P_B$ is the static pressure at the outlets of the at least one nozzle hole; and $P_G$ is the pressure of the gas flowing from the gas inlet.

22. The apparatus according to claim 21, wherein each of said nozzle holes is formed so as to jet bubbles dispersed in said liquid containing suspended particles, each of said nozzle holes having a diameter of several micrometers to several hundred micrometers.

* * * * *